United States Patent
Parke

(10) Patent No.: US 9,593,029 B2
(45) Date of Patent: Mar. 14, 2017

(54) MOBILE WATER TREATMENT AND RESIN TRANSFER HUB

(71) Applicant: General Electric Company, Schenectady, NY (US)

(72) Inventor: Andrew Parke, Peterborough (GB)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 45 days.

(21) Appl. No.: 14/645,745

(22) Filed: Mar. 12, 2015

(65) Prior Publication Data
US 2015/0183665 A1    Jul. 2, 2015

Related U.S. Application Data

(62) Division of application No. 13/208,537, filed on Aug. 12, 2011, now Pat. No. 9,005,448.

(51) Int. Cl.
*C02F 1/42* (2006.01)
*B01J 49/00* (2006.01)
(Continued)

(52) U.S. Cl.
CPC .............. *C02F 1/42* (2013.01); *B01J 47/002* (2013.01); *B01J 47/04* (2013.01); *B01J 47/08* (2013.01);
(Continued)

(58) Field of Classification Search
CPC .. B01J 47/002; B01J 49/0082; B01J 49/0086; C02F 1/42; C02F 2201/008
See application file for complete search history.

(56) References Cited

U.S. PATENT DOCUMENTS

| 3,190,320 A * | 6/1965 | Burgess | B01J 47/002 141/1 |
| 4,049,548 A * | 9/1977 | Dickerson | B01J 47/002 210/241 |

(Continued)

FOREIGN PATENT DOCUMENTS

| CN | 2061171 U | 8/1990 |
| CN | 201182991 Y | 1/2009 |

(Continued)

OTHER PUBLICATIONS

Unofficial English Translation of Chinese Office Action issued in connection with corresponding CN Application No. 201280039416.3 on Aug. 4, 2015.
(Continued)

*Primary Examiner* — Matthew O Savage
(74) *Attorney, Agent, or Firm* — GE Global Patent Operation; Catherine J. Winter

(57) ABSTRACT

A system and method for providing mobile or temporary water treatment involving ion exchange resins includes a service center, one or more treatment vehicles, a resin transfer hub and one or more resin transport vehicles. The service center can be used to regenerate one or more types of ion exchange resins. The treatment vehicle carries water treatment equipment including a tank holding ion exchange resin. The resin transfer hub facilitates moving resin between a treatment vehicle and a resin transport vehicle. The resin transport vehicle is adapted for carrying resin by one or more of land, sea and air between the resin forwarding center and the service center. In operation, a treatment vehicle brings resin requiring regeneration to the resin transfer hub, where it is emptied and then re-filled with regenerated resin. Resin requiring regeneration is transferred to a resin transport vehicle for transport to the service center. The resin transport vehicle is re-filled there with regenerated (Continued)

resin, which is taken back to the resin transfer hub for transferred to a treatment vehicle.

9 Claims, 4 Drawing Sheets

(51) Int. Cl.
*B01J 47/00* (2006.01)
*B01J 47/08* (2006.01)
*B01J 47/12* (2006.01)
*B01J 47/04* (2006.01)

(52) U.S. Cl.
CPC ........... *B01J 47/12* (2013.01); *B01J 49/0017* (2013.01); *B01J 49/0021* (2013.01); *B01J 49/0078* (2013.01); *B01J 49/0082* (2013.01); *B01J 49/0086* (2013.01); *C02F 2201/008* (2013.01); *C02F 2303/16* (2013.01)

(56) References Cited

U.S. PATENT DOCUMENTS

| | | | | |
|---|---|---|---|---|
| 4,114,661 A | * | 9/1978 | Harris | B01J 49/0026 141/231 |
| 4,383,920 A | * | 5/1983 | Muller | B01D 15/00 210/241 |
| 6,921,478 B2 | * | 7/2005 | Lambert | B01D 21/01 210/104 |

FOREIGN PATENT DOCUMENTS

| | | |
|---|---|---|
| CN | 101816960 A | 9/2010 |
| FR | 2309274 A1 | 11/1976 |
| JP | 0231839 A | 2/1990 |
| RU | 40315 U1 | 9/2004 |
| RU | 45640 U1 | 5/2005 |
| RU | 76641 U1 | 9/2008 |

OTHER PUBLICATIONS

Bureau, "A Simulation Test Report(Summary) of The Double-Tower-Type Moving Bed's Continuous Ion Exchange Water Softening Plant", China Academic Journal Electronic Publishing House, Communication of Railway Standard Design,vol. No. Z1 pp. 34-43, 1971.

Unofficial English Translation of Chinese Office Action issued in connection with corresponding CN Application No. 201280039416.3 on Feb. 6, 2016.

Russian Office Action issued in connection with corresponding RU Application No. 2014103697 on May 31, 2016.

Russian Office Action issued in connection with corresponding RU Application No. 2014103697 on Oct. 12, 2016.

* cited by examiner

MOBILE WATER TREATMENT AND RESIN TRANSFER HUB

CROSS-REFERENCE TO RELATED APPLICATIONS

This application is a divisional of U.S. patent application Ser. No. 13/208,537, filed Aug. 12, 2011, which is hereby incorporated by reference in its entirety.

FIELD

This specification relates to water treatment using ion exchange resins and to a system and method for providing mobile or temporary water treatment involving ion exchange resins.

BACKGROUND

In a mobile water treatment system, water treatment equipment is provided in a portable vehicle, such as a truck, trailer, skid or transport container, and delivered to a location where water treatment is required. Such mobile water treatment systems are used when it would be less economical to build a permanent treatment plant. For example, temporary water treatment may be required when a power plant is commissioned; when permanent water treatment plants are being repaired; for forestry or mining camps; or, to provide feed water for boilers that operate seasonally. In general, treated water may be required at a particular site for a period of time that may be up to several years but is still less that the lifetime of a permanent water treatment plant. Alternatively, treated water may be required permanently but for only part of each year, for example between about 1,000 to 2,000 hours per year. In both of these cases, it can be less expensive for the site operator to rent a mobile water treatment system than to build a permanent facility.

The vehicle in a mobile water treatment system may be fitted with, among other things, various sorts of tanks, media, pumps, pipes, controls and instrumentation. In the MobileFlow™ system by GE Water & Process Technologies, for example, a transport truck trailer is fitted with six tanks that are made of steel, lined with rubber, and capable of being pressurized to 100 psi. The tanks are connected together with a standard piping system that allows the tanks to be connected together in series or parallel. Each tank can be filled with one of a selection of available media types such as granular filter media, deoxygenation media, or ion exchange resin beads. For example, to provide demineralization treatment some tanks are filled with cation exchange resin, other tanks are filled with strong base anion exchange resin, and another tank is filled with a mixed bed. Each trailer also includes an instrumentation package, a controls package and a heating system. The trailer is set up and tested at a service centre, and then trucked to the treatment site to be put in operation.

In cases where resin beads are used, the resin beads must be regenerated from time to time. In the MobileFlow™ system, the vehicle is returned to the service centre where the resin beads are transferred into regeneration vessels and stored there until the beads can be regenerated. Previously regenerated resin is transferred back on to the vehicle, which can then be sent back to the same or another water treatment site. In this way, water for regeneration is not required at the treatment site, which may be in a water scarce location, and regeneration waste water does not need to be discharged at the water treatment site, which may not have a waste water discharge permit. Further, comprehensive regeneration processes, including for example backwashing and air scrubbing, treatment with regenerants, rinsing with deionized water and quality testing, can be provided at the service centre.

INTRODUCTION TO THE INVENTION

Mobile water treatment systems provide a valuable service, saving many users of treated water the cost of building their own treatment plant. However, building a service centre is a significant expense, on the order of several million dollars. Accordingly, it is desirable to obtain the maximum possible use from a service centre by having it serve a very large service area. This in turn may require having treatment system trailers moving at times over very long distances. Towards the edges of a service area, the trailers may need to cross through multiple states or provinces in a North American market, or cross through multiple countries in a European or Asian market, to move between a service centre and a treatment site. For treatment systems using ion exchange resins that are returned from time to time to the service centre for regeneration, the cost of moving the trailers can add significantly to the cost of providing treated water at the site.

A system and method for providing mobile or temporary water treatment involving ion exchange resins are described in this specification, along with a resin transfer hub for use in the system. The system includes a service centre, one or more treatment vehicles, a resin transfer hub, and one or more resin transport vehicles. The service centre is used, possibly among other things, to regenerate one or more types of ion exchange resins. A treatment vehicle may be a trailer or any other type of vehicle, including a container adapted to be carried by another vehicle, that is transportable by land, sea or air and carries water treatment equipment including a tank for holding ion exchange resin. The resin transfer hub is a facility located permanently or temporarily apart from the service centre for moving resin between a treatment vehicle and a resin transport vehicle. Optionally, additional items such resin storage vessel or a make up water supply system may be provided with or in the resin transfer hub. The resin transport vehicle is a vehicle, which may include a container capable of being carried by another vehicle, adapted for transporting resin by land, sea or air between the resin transfer hub and the service centre.

In operation, one or more treatment vehicles may be transported directly to and from the service centre when they contain resin requiring regeneration. However, one or more treatment vehicles may alternatively bring resin requiring regeneration to the resin transfer hub, to be emptied and then re-filled there with regenerated resin. The resin transfer hub is used to transfer resin requiring regeneration to a resin transport vehicle, directly or through an intermediate storage step. The resin transport vehicle transports resin requiring regeneration to the service centre and is re-filled there with regenerated resin. The regenerated resin is taken back to the resin forwarding centre from where it can be transferred into one or more treatment vehicles.

One possible advantage of the system is a reduction in the transportation or system capital costs required to supply treatment sites far from the service centre with regenerated resin. This in turn may allow a service centre to serve a larger service area, reducing the overhead cost of the service centre per treatment site in the service area. If a treatment site must be shut down while its resin is being regenerated, then down time at the treatment site may also be reduced.

Savings in cost may result from one or more of the differences between the treatment vehicle and the resin transport vehicle. The resin transport vehicle does not require multiple pressure resistant tanks or extensive piping, instrumentation, controls or heat. The resin transport vehicle may therefore be able to store more resin within the same external dimensions, or within the same weight limitation, compared to the treatment vehicle. The resin transport vehicle can also be less expensive than a treatment vehicle and thereby decrease the total cost of the vehicle inventory of the system, or all for more vehicles within the same total cost. Using the resin transport vehicle for long haul shipping may also reduce damage during transport to instruments and controls in the treatment vehicle. The resin transport vehicle may also be more easily or economically provided in the form of an ISO or other intermodal container, which may allow for shipment by two or more of road, rail, sea or air. Optionally, the resin transport vehicle may be able to also function as storage vessel while at the resin transfer hub. Further optionally, the resin transfer hub may be portable such that the resin transfer hub can be moved if the location of distant treatment sites changes.

DETAILED DESCRIPTION

An example of a system and method for providing mobile or temporary water treatment involving ion exchange resin, and a resin transfer hub, will be described below.

Figure 1:
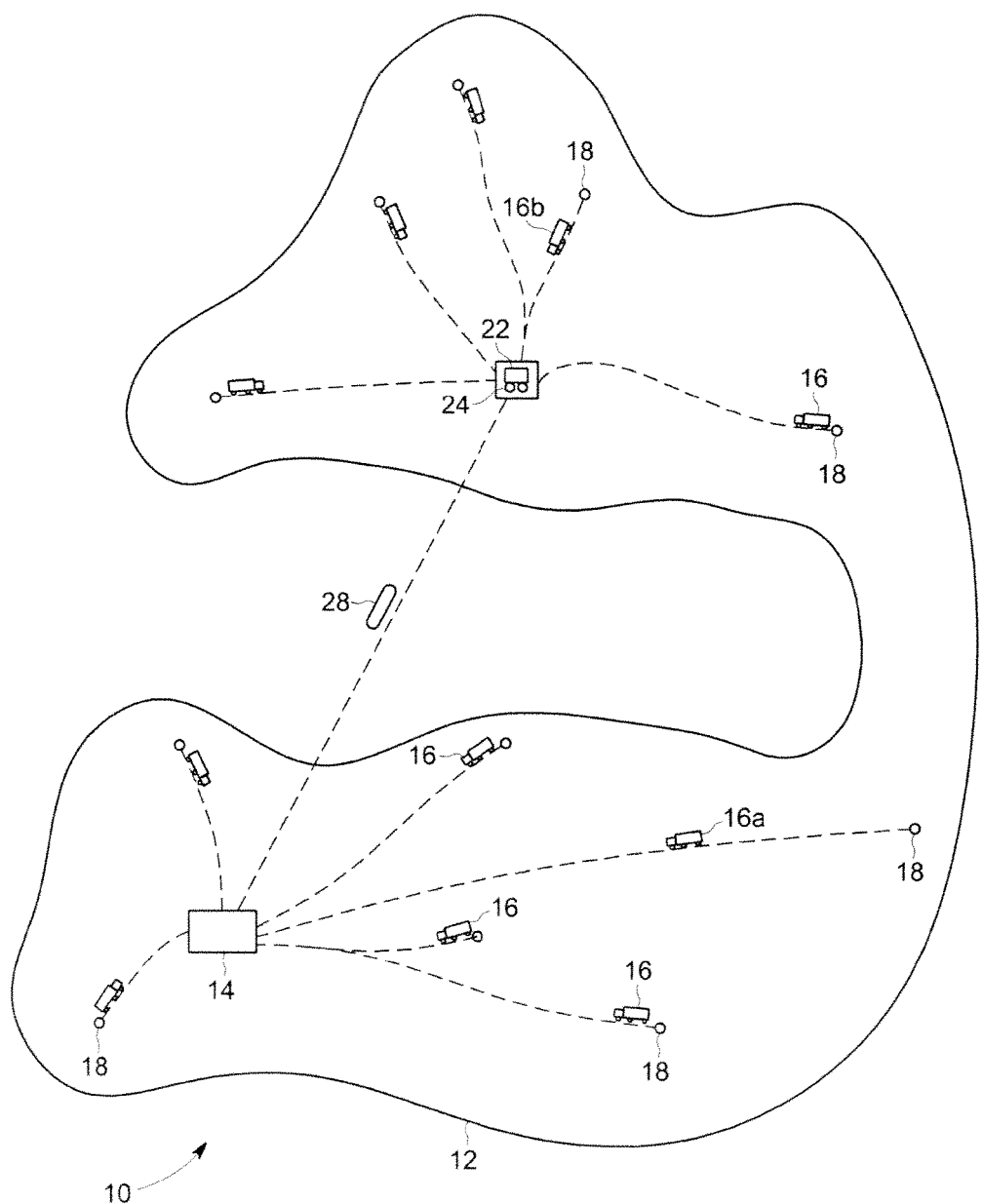
FIG. 1 is a schematic overview of a system for providing mobile or temporary water treatment involving ion exchange resins.

Referring to FIG. 1, a service area 10, represented by a large area of land 12, has a service centre 14 located in one part of it. The service centre includes equipment for regenerating spent ion exchange resins. At the service centre 14, resin beads needing regeneration are transferred from a vehicle carrying them to storage vessels where the beads can be regenerated. The regeneration process may include, for example, an air scrub, backwash, chemical regenerant application and deionized water rinse. The regenerated resin may also be tested or analyzed to determine the degree or quality of the regeneration. For mixed resin beds, there are also additional steps of separating the mixed bed before the resin is regenerated and, optionally, re-mixing the resins. The regenerated resin beads can then be transferred back to a vehicle. While some resins, particularly cation resins used in water softening, may be regenerated with relatively harmless chemicals such as salt, other resins are regenerated with strong acids, such as hydrochloric acid, or a caustic such as sodium hydroxide. Accordingly, the service centre 14 is located in an area where water treatment facilities or discharge permits are available. Further, due to the need to provide regeneration and rinse water, the service centre 14 is also located in an area in which water for these tasks is available.

One or more of the treatment sites 18 may be located far from the service centre 14. Further, the most efficient transport method to the remote treatment sites 18 may be by means other than truck, for example by rail or ship. In FIG. 1, for example, a body of water adds to the already lengthy distance required to reach the remote treatment sites 18 by truck. For shipping resin to or from distant treatment sites 18, a resin transport vehicle 28 is used to carry resin between the service centre 14 and a resin forwarding centre 24. When a treatment vehicle 16, such as the treatment vehicle 16b shown in FIG. 1, has resin that needs to be recharged, the treatment vehicle 16 travels to the resin forwarding centre 24 to drop off its spent resin and to be re-filled with regenerated resin.

Figure 2:
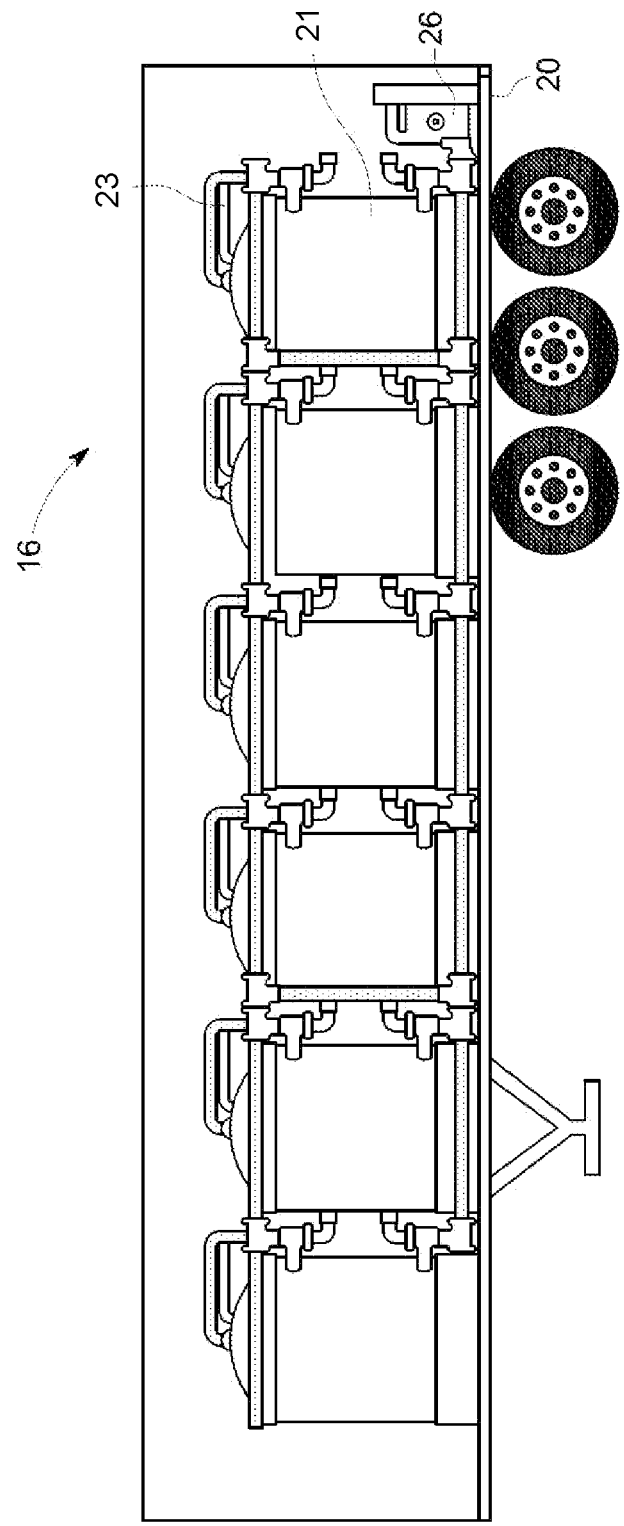
FIG. 2 is a side view of a treatment vehicle.

Resin may be loaded from the service centre 14 into one or more treatment vehicles 16 for transport to a treatment site 18. The treatment site 18 may be, for example, a power station, a factory, a mining or forestry camp, or a factory with a boiler. The treatment vehicle 16 may be, for example, a transport truck trailer 16 as shown in FIG. 2. This treatment vehicle 16 is fitted with tanks 21, a piping network 23, and a controls, instrumentation and heating package 26. Various connections are provided to the tanks including a liquid inlet, a liquid outlet and a compressed air fitting. When the treatment vehicle 16 is used to treat water using ion exchange resins, for example to provide demineralization, softening or condensate polishing, one or more of the tanks 21 are filled with resin from the service centre 14 before the treatment vehicle 16 is deployed at a treatment site 18. As shown by treatment vehicle 16a, the treatment vehicle 16 also travels back to the service centre 14 from time to time so that the resins that it contains can be regenerated. Optionally, a substitute treatment vehicle 16 may be sent to a treatment site 18 requiring regeneration before its operating treatment vehicle 16 is removed. In that case, the first treatment vehicle 16 becomes the substitute treatment vehicle 16 once it is removed from the treatment site 18, and might not return to the same treatment site 18.

Figure 3:
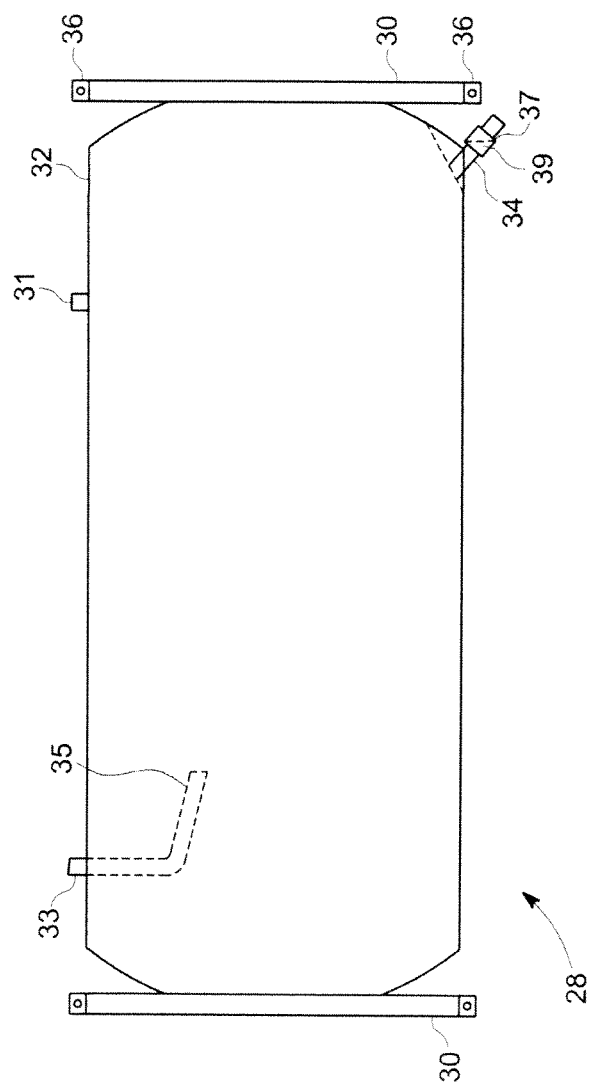
FIG. 3 is a side view of a resin transport vehicle.

Referring to FIG. 3, an example of a resin transport vehicle 28 has a frame 30 that is fitted with a large tank 32. The frame 30 may be of a standard size and may be fitted with standardized mounting points 36 such that is can function as an ISO inter-modal shipping container. The tank 32 has an outlet 34 for discharging resin from the tank 32 and an inlet 33 for filling the tank 32 with water or a slurry of resin beads in water. The outlet 34 is located near the bottom of the tank 32 and provided with one or more valves. The outlet 34 may also be fitted with a chamber 37 adapted to accept a removable screen 39 having a mesh size sufficiently small to retain resin beads in the tank 32 while allowing water to drain out. The inlet 33 is located at the top of the tank 32, optionally in the opposite end of the tank 32 from the outlet 34. The inlet 33 may also have a nozzle 35 directed generally toward the outlet 34. The nozzle 35 assists in using water sprayed through the inlet 33 to force resin from the tank 32. The tank 32 also has a compressed air fitting 31. The resin transport vehicle 28 may have a capacity of 20 cubic meters or more, which may be greater than the capacity of all of the tanks in the water treatment vehicle 16.

Figure 4:
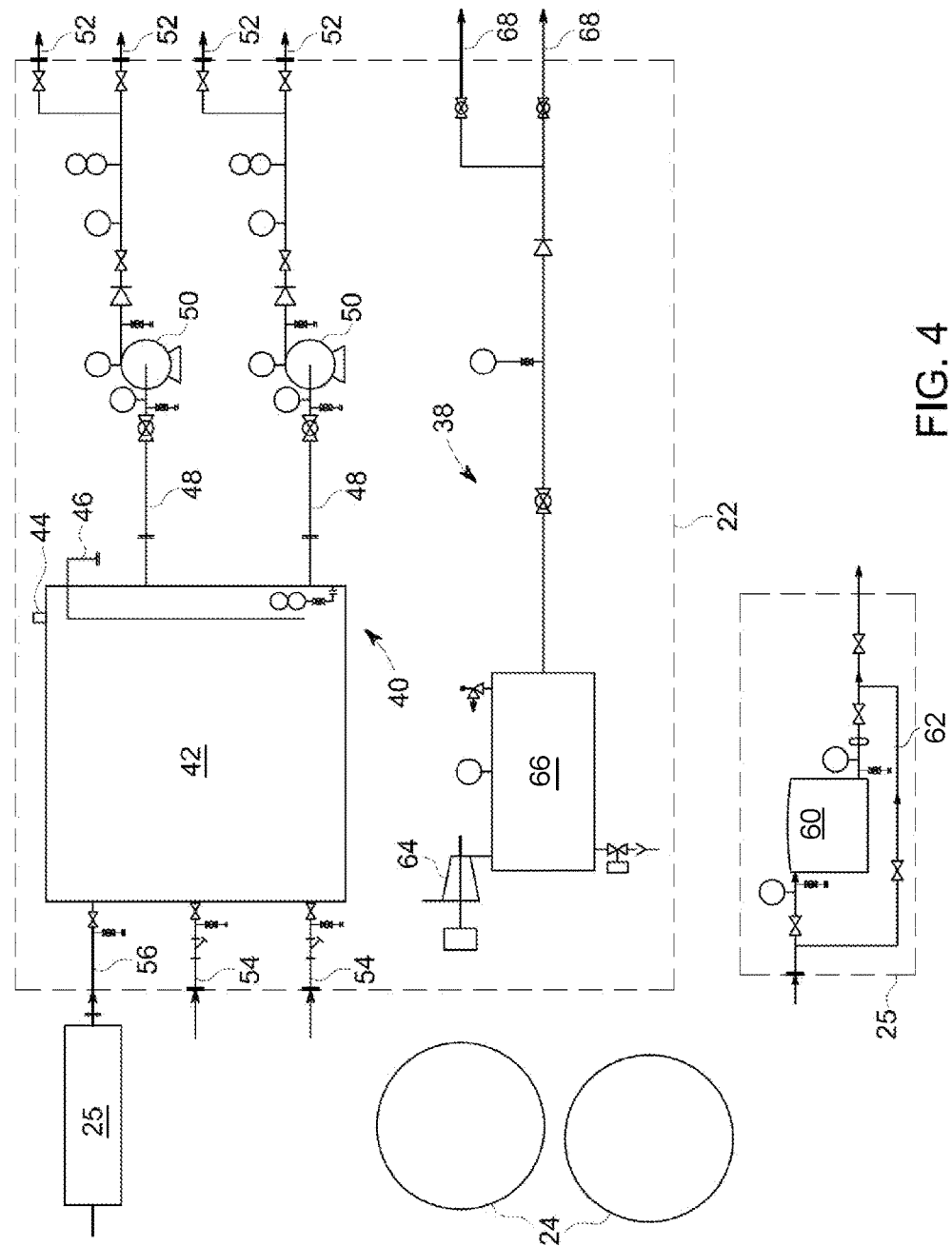
FIG. 4 is a schematic illustration of a resin transfer hub and an optional storage vessel and make up water polishing system.

Referring to FIG. 4, the resin transfer hub 22 may be located with one or more optional storage vessels 24, for example a silo. The storage vessel 24 may have a liquid inlet, a liquid outlet and a compressed air fitting. An optional water polishing unit 25 may also be provided. The resin transfer hub 22 may be transportable and can be moved if the location of treatment sites 18 changes over time. For example, the resin hub 22 may be built inside of a 40 foot long high cube shipping container that can be moved by truck, rail or boat. The resin hub 22 is equipped for moving resin beads between any two tanks, for example between a storage vessel 24 and a treatment vehicle 16, between a storage vessel 24 and a resin transport vehicle 28, or between a resin transport vehicle 28 and a treatment vehicle 16.

To move resin beads, the resin transfer hub 22 has a water circulation system 40 and a compressed air supply system 38. The water circulation system 40 has a tank 42, which may have a volume of 10 cubic meters or more. The tank 42 also has a vent 44 and an overflow pipe 46. One or more outlets 48 of the tank are connected to one or more liquid pumps 50 which are in turn connected to one or more fittings 52 for connecting the outlet side of a pump 50 to a pipe or a fitting on a treatment vehicle 16, storage vessel 24 or resin transport vehicle 28. One or more inlets 54 allow water returning from a treatment vehicle 16, storage vessel 24 or resin transport vehicle 28 to return to the tank 42.

A make up water inlet 56 may be used to provide make up water to the tank 42. The make up water is preferably deionized water so that water used in transferring regenerated resin will not use up any significant part of the capacity of the resin. Deionozed water may be obtained by treating municipal supply water from time to time through a treatment vehicle 16 on its way to or from a treatment site 18, or by a small the optional water polishing unit 25. The water polishing unit has one or more resin tanks 60 filled with cation, anion and mixed resin beds to treat raw water. A by-pass line 62 is provided to allow already deionized make up water, when available, to be filled directly into the tank 42.

The compressed air supply system 38 uses a compressor, for example a turbine 64, to supply compressed air to a reservoir 66. The reservoir 66 is in turn connected to one or more air outlets 68 for providing the compressed air to a treatment vehicle 16, storage vessel 24 or resin transport vehicle 28. The resin transfer hub 22 may also have various ancillary components such as valves, sensors, gauges, or controllers as may be desirable for recirculating water through, and providing air to, a treatment vehicle 16, storage vessel 24 or resin transport vehicle 28.

In transferring resin beads, a first treatment vehicle 16, storage vessel 24 or resin transport vehicle 28 provides a tank being emptied and a second treatment vehicle 16, storage vessel 24 or resin transport vehicle 28 provides a tank being filled. The tank being emptied is filled with water from the tank 42 of the resin hub 22 to above the level of the resin beads. The tank being emptied is then pressurized with compressed air, for example to 20 to 30 psi. Opening an outlet valve in the tank being emptied allows a slurry of water and resin bead to flow through a transfer pipe connected between the outlet of the tank being emptied and an inlet of the tank being filled. Additional water may be pumped from the tank 42 into the tank being emptied, or directly into the transfer pipe, to aid in moving the resin slurry. The water used in the transfer drains from the tank being filled back to the tank 42 of the resin hub 22 through a return pipe for reuse. If not provided in with the outlet of the tank being filled, a strainer in the return pipe keeps resin beads from flow back to the tank 42. Water draining back to the tank 42 may be recirculated back to the tank being emptied to help move the resin beads, particularly when the tank is nearly empty.

Almost all, for example 95% or more, of the resin in the tank being emptied may be transferred to the tank being filled as described above. Some resin beads may remain at the bottom of the tank being emptied, but can be removed later, for example by flushing these remains into filter bags. Some resin beads may also remain in the pipe, but can be removed later, for example by flushing the pipe. If the tank being emptied is a longer than it is high, such as the resin transport vessel 28, one end of the tank may be raised so that the tank bottom slopes towards the resin outlet.

Other means of transferring resin, or enhancing the movement of resin, may also be used. For example, compressed air can be provided or a recirculating flow of water may be provided from the bottom of a bed of resin to fluidize the bed allowing it to flow more easily, possibly by gravity. An impeller may also be used to fluidize the bed. A positive displacement diaphragm pump may be used to move the slurry through a transfer pipe between the tank being emptied and the tank being filled. As a further alternative, the tank being emptied may be filled with water and a drain pipe may be connected upstream of an ejector to form an eductor system. The ejector is fed with a flow of pressurized water creating a local vacuum to draw resin into the ejector from where the pressurized water carries the resin beads through a transfer hose. By any of these methods, a flow of resin beads in a slurry can be made to flow through a pipe that discharges into the tank being filled.

If a mixed bed is required in the treatment vehicle 16, the mixed bed may be prepared in a mixing tank, which may be a tank of the treatment vehicle 16 that will use the mixed bed. Alternatively, any other tank in any vehicle or vessel 16, 24 or 28 may be used as the mixing tank, and the mixed bed may be transferred to the treatment vehicle 16 after it is mixed. To prepare the mixed bed, appropriate amounts or cation and anion resin are separately loaded into the mixing tank. Water is added to above the level of the resin beads. A vent or inlet at the top of the mixing tank is kept open while compressed air flows into the tank from near the bottom of the mixing tank. While the compressed air continues to flow, the water level in the mixing tank is lowered in steps or in a slow continuous drain. The compressed air flow is stopped when the water level is at or near the bottom of the mixing tank, and the mixing tank is left to drain.

After a transfer of resin beads, the water used to fluidize the resin beads is allowed to drain back in to the tank 42 for re-use. Optionally, compressed air my be supplied to the filled or emptied tank, or both, to assist with the draining. In the filled tank in particular, the compressed air is useful for draining water from the resin bed. A screen is fitted at the outlet of a filled tank so that resin beads will not be carried back to the tank 42. Some water is lost due to incomplete draining of the filled tanks. The water in the tank 42 may also become too turbid to re-use, requiring that it be wasted, treated or diluted. The resin transfer hub 22 thus may use some water, but in vastly reduced amounts relative to the service centre 14 and without using or discharging significant amounts of chemicals. The resin transfer hub 22 may therefore be located in an area where water is scarce and waste water treatment or discharge permitting is limited or not available. Optionally, the resin transfer hub 22 may be fitted with two tanks 42, one used for transferring regenerated resin and one used for transferring spent resin. In this way, water used for transferring regenerated resin would remain clean longer, while water used to transfer spent resin may be allowed to become more turbid than would be acceptable for moving regenerated resin. Less make up water would be required to maintain a supply of water at an acceptable quality for transferring spent and regenerated resin.

Separate resin storage vessels 24, if any, may be provided for cation resins and anion resins and mixed resins and resin transport vessels 28 may be filled with only cation resins or only anion resins when transporting regenerated resin to the resin hub 22. In this way, the resin hub 22 does not need to be provided with resin separation equipment. However, resin separation equipment may optionally be provided in the resin hub 22. For the return of spent resin from the resin hub 22 to the service centre 24, resins of different types may be transferred into a single resin transport vessel 28 provided the service centre has resin separation equipment.

Returning to FIG. 1, when treatment vehicles 16 have resin requiring regeneration, they are transported to the resin transfer hub 22. Spent resin is transferred from the treatment vehicle 16 at the resin hub 22 to a resin storage vessel 24 or directly into a resin transport vehicle 28. Optionally, a resin transport vehicle 28 may be used as a resin storage vessel 24 by leaving it at the resin forwarding hub 22. Regenerated resin from another resin storage vessel 24 or resin transport vehicle 28 is transferred through the resin hub 22 to re-fill the treatment vehicle 16. The treatment vehicle 16 can be put back in service at the same or another treatment site 18. If the spent resin was first transferred to a resin storage vessel 24, it is re-transferred through the resin transfer hub 22 to a resin transport vehicle 28. The resin transport vehicle 28 is then transported to the service centre 14. The resin is regenerated at the service centre 14, and the resin transport vehicle 28 is re-filled with regenerated resin to be returned to the resin transfer hub 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system for providing temporary or mobile water treatment using ion exchange resins comprising:
   a service center adapted to regenerate one or more types of ion exchange resins;
   a water treatment vehicle comprising a water treatment tank for containing a quantity spent ion exchange resin and an amount of water sufficient to fill the water treatment tank to a level above a level of the spent ion exchange resin and adapted to permit water being treated to flow through the resin;
   first and second resin transport vehicles each having a storage tank for receiving ion exchange resin, wherein the storage tank of the first resin transport vehicle is for containing spent ion exchange resin and the storage tank of the second resin transport vehicle is for containing regenerated ion exchange resin;
   a resin transfer hub having a compressed air system for moving spent ion exchange resin between the water treatment tank of the water treatment vehicle and the storage tank of the first resin transport vehicle using the compressed air system and for moving regenerated ion exchange resin between the storage tank of the second resin transport vehicle and the water treatment tank of the water treatment vehicle using the compressed air system; and
   wherein the resin transfer hub is provided on or in a resin transfer hub vehicle that is separate from the first and second resin transport vehicles.

2. The system of claim 1 wherein the water treatment vehicle comprises a trailer adapted for transport by road.

3. The system of claim 1 wherein the first and second resin transport vehicles each comprises a tank mounted to a frame and the frame is adapted to be carried on the respective first and second resin transport vehicle.

4. The system of claim 3 wherein the first and second resin transport vehicles each comprises standardized mounting points that are positioned such that the resin transport vehicle may be transported through an ISO inter-modal transportation system.

5. The system of claim 3 wherein the first and second resin transport vehicles each further comprises an inlet near the top of the tank and an outlet near the bottom of the respective storage tank.

6. The system of claim 1 wherein the resin transfer hub vehicle is a shipping container.

7. The system of claim 1 further comprising a resin storage vessel connected to the resin transfer hub.

8. The system of claim 7 wherein the resin storage vessel comprises a silo.

9. The system of claim 1 further comprising a polishing unit having one or more tanks containing cation, anion and mixed resin beds, the resin tank connected to an inlet to the resin transfer hub.

* * * * *